United States Patent
Mital et al.

(10) Patent No.: US 7,383,240 B2
(45) Date of Patent: Jun. 3, 2008

(54) OPERATIONALIZING A GOAL

(75) Inventors: Vijay Mital, Fremont, CA (US);
Sanjay Kumar, Coppell, TX (US);
Stanton L. Thomas, Incline Village, NV (US); William L. Bowers, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 972 days.

(21) Appl. No.: 10/308,333

(22) Filed: Dec. 2, 2002

(65) Prior Publication Data

US 2003/0158766 A1    Aug. 21, 2003

Related U.S. Application Data

(60) Provisional application No. 60/359,058, filed on Feb. 20, 2002.

(51) Int. Cl.
*G06N 5/04* (2006.01)
(52) U.S. Cl. ............... 706/47; 706/45; 706/46; 700/28; 705/7; 705/11
(58) Field of Classification Search ......... 706/10, 706/12–15, 19, 45–47, 59–61; 700/1, 28–34, 700/47–52, 90–93, 95–109, 173, 174; 705/1, 705/7–12, 28, 29, 35
See application file for complete search history.

(56) References Cited

U.S. PATENT DOCUMENTS

| | | | | |
|---|---|---|---|---|
| 5,299,287 | A | * | 3/1994 | Tsuruta et al. ............... 706/46 |
| 5,369,570 | A | * | 11/1994 | Parad ............................ 705/8 |
| 5,784,286 | A | | 7/1998 | Hirose et al. ............... 364/488 |
| 5,812,994 | A | * | 9/1998 | Imlah .......................... 706/45 |
| 6,151,582 | A | | 11/2000 | Huang et al. ................. 705/8 |
| 6,167,445 | A | | 12/2000 | Gai et al. .................... 709/223 |
| 6,892,192 | B1 | * | 5/2005 | Geddes et al. ............... 706/14 |
| 6,996,843 | B1 | * | 2/2006 | Moran ........................ 726/23 |
| 2003/0229529 | A1 | * | 12/2003 | Mui et al. ...................... 705/8 |

* cited by examiner

*Primary Examiner*—David Vincent
*Assistant Examiner*—Omar F Fernandez Rivas
(74) *Attorney, Agent, or Firm*—Booth Udall, PLC

(57) ABSTRACT

Operationalizing a goal includes receiving the goal and execution rules associated with the goal, where one or more execution rules correspond to an execution system operable to initiate execution of the execution rules. The goal is represented in a representation language that includes a set of operations. An operation of the set of operations is applied to the goal to partition the goal into subgoals. For each subgoal, an operation of the set of operations is applied to the subgoal to derive and configure one or more execution rules associated with the subgoal. The goals, the applied operations, the subgoals, and the execution rules are recorded as operationalized knowledge to operationalize the goal.

29 Claims, 4 Drawing Sheets

OPERATIONALIZING A GOAL

RELATED APPLICATION

This application claims benefit under 35 U.S.C. §119(e) of U.S. Provisional Application No. 60/359,058, entitled "Operationalizing Corporate Goals, Contracts and Commitments Within Multiple Transaction Execution Systems," filed Feb. 20, 2002.

TECHNICAL FIELD OF THE INVENTION

This invention relates generally to planning and management and more specifically to operationalizing a goal.

BACKGROUND OF THE INVENTION

Companies and other organizations are often faced with the task of operationalizing a goal for one or more execution systems that operate to satisfy the goal. Operationalizing a goal involves formulating a plan describing how the execution systems are to satisfy the goal and instructing the execution systems to operate according to the plan. Formulating the plan, however, may be difficult, especially if the relationships among the execution systems are complex. Instructing the execution systems may also be difficult, especially if the execution systems operate according to different protocols. Consequently, operationalizing a goal has posed challenges for companies and other organizations.

SUMMARY OF THE INVENTION

In accordance with the present invention, disadvantages and problems associated with techniques for operationalizing a goal may be reduced or eliminated.

According to one example of the present invention, operationalizing a goal includes receiving the goal and execution rules associated with the goal, where one or more execution rules correspond to an execution system operable to initiate execution of the execution rules. The goal is represented in a representation language that includes a set of operations. An operation of the set of operations is applied to the goal to partition the goal into subgoals. For each subgoal, an operation of the set of operations is applied to the subgoal to derive and configure one or more execution rules associated with the subgoal. The goals, the applied operations, the subgoals, and the execution rules are recorded as operationalized knowledge to operationalize the goal.

Certain examples of the invention may provide one or more technical advantages. A technical advantage of one example may be that a goal is partitioned into one or more subgoals, which may be used to configure execution rules for execution systems in accordance with the goal. An operation may be applied to a goal to partition the goal into subgoals, and operations may be applied to the subgoals to configure the execution rules. Another technical advantage of one example may be that the relationships between the goals, subgoals, and execution rules are captured as operationalized knowledge. The operationalized knowledge may record the operations applied to the goal to partition the goal into subgoals, and the operations applied to subgoals to derive and configure the execution rules. Another technical advantage of one example may be that operationalized knowledge may be used to determine how a modification of the goal generates modifications for the subgoals and execution rules. Another technical advantage of one example may be that the operationalized knowledge may be used to determine performance data for a goal from performance data for an execution rule. Examples of the invention may include none, some, or all of these technical advantages. One or more other technical advantages may be readily apparent to one skilled in the art from the figures, descriptions, and claims included herein.

BRIEF DESCRIPTION OF THE DRAWINGS

For a more complete understanding of the present invention and for further features and advantages, reference is now made to the following description, taken in conjunction with the accompanying drawings, in which.

DESCRIPTION OF EXAMPLE EMBODIMENTS

Figure 1:
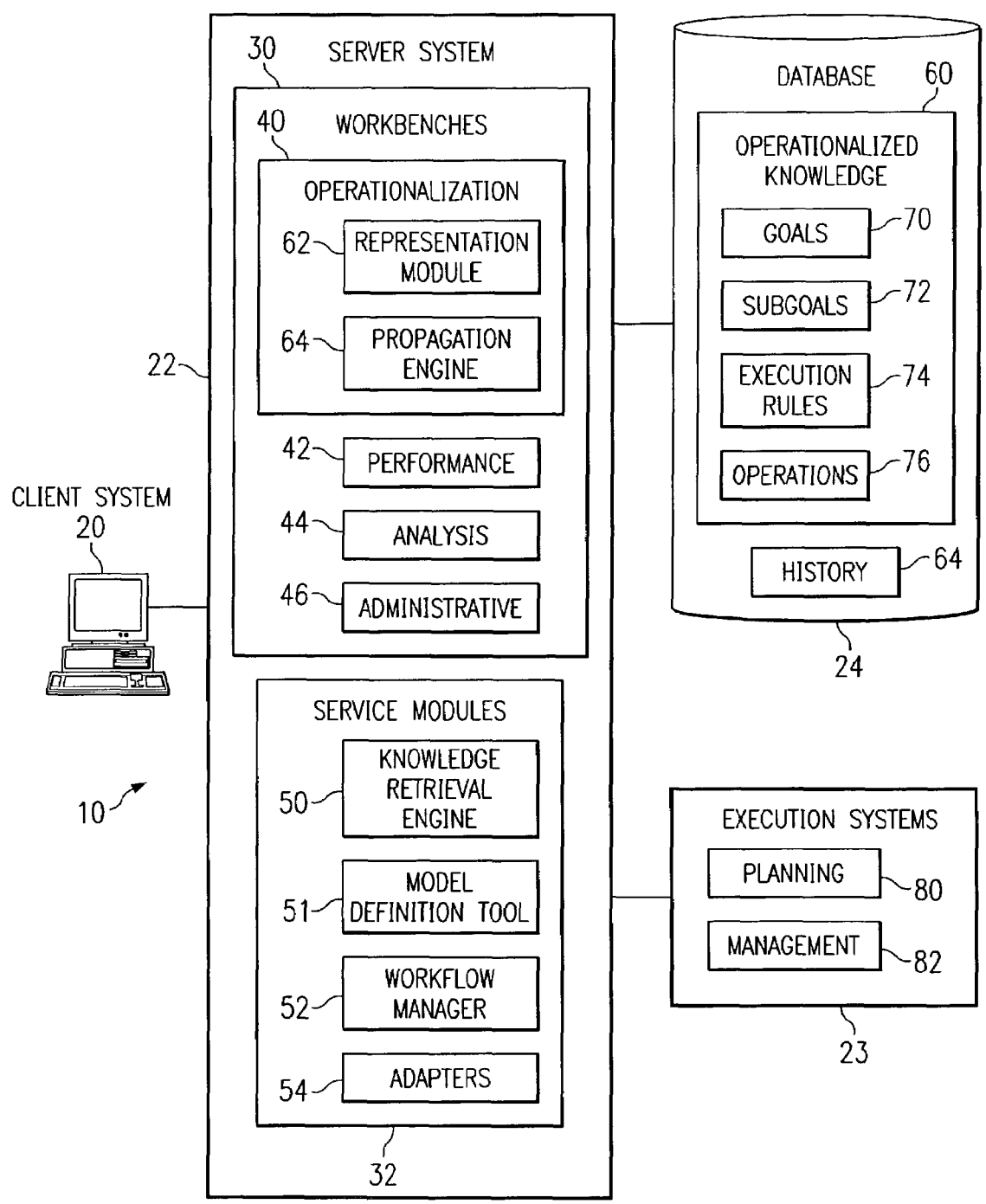
FIG. 1 illustrates an example system for operationalizing a goal.

FIG. 1 illustrates an example system 10 for operationalizing a goal. In general, system 10 partitions a goal into subgoals, which are used to configure execution rules that are executed by one or more execution systems that operate to satisfy the goal. For example, a goal for a company may be partitioned into subgoals for the divisions of the company. The subgoals may be used to configure execution rules for planning and management execution systems. System 10 may also propagate a modification of the goal through the subgoals to determine modifications of the subgoals and execution rules. Performance of the execution systems may be monitored using system 10 to determine whether the goal and subgoals are being satisfied. According to one example, the term "goal" may refer to a business goal, a contractual commitment, an internal policy, or other goal that may be satisfied by the execution systems. Other goals may include, for example, military objectives or engineering project goals.

System 10 may include a client system 20, a server system 22, one or more execution systems 23, and a database 24 internal or external to server system 22, each of which may operate on one or more computers at one or more locations. As used in this document, the term "computer" refers to any suitable device operable to accept input, process the input according to predefined rules, and produce output, for example, a personal computer, workstation, or any other suitable processing device. As used in this document, the term "each" refers to each member of a set or each member of a subset of the set. A computer may include appropriate input devices, output devices, mass storage media, processors, memory, or other components for receiving, processing, storing, and communicating information according to the operation of system 10.

Client system 20 may comprise a computer operable to accept input from a user and to report output to the user. Server system 22 manages applications that operationalize a goal. Server system 22 may include one or more workbenches 30 and one or more service modules 32. Workbenches 30 perform operations for operationalizing a goal. For example, workbenches 30 may be used to operationalize a goal, propagate a modification of a goal to the execution rules, and determine satisfaction of the goal from performance of execution systems 23. Service modules 32 provide services for workbenches 30. For example, service modules 32 may be used to retrieve data from database 24, define goals and subgoals, and manage workflows used to operationalize a goal.

Workbenches 30 may include, for example, an operationalization workbench 40, a performance workbench 42, an analysis workbench 44, and an administrative workbench 46. Workbenches 30 may include additional or alternative workbenches suitable for operationalizing a goal. Operationalization workbench 40 is used to perform operations on goals. Operations may include, for example, adding a goal, partitioning a goal into subgoals, and configuring execution rules according to the subgoals. Operationalization workbench 40 may include a representation module 62 and a propagation engine 64.

Representation module 62 may be used to represent a goal in a representation language. The representation language may include operations such as transformations that may be applied to a goal to generate subgoals or applied to subgoals to configure execution rules. The goal may have parameters that take on values that are transformed by an operation to determine values for parameters of the subgoals. Similarly, the values of the subgoals may be transformed by operations to determine values for parameters of the execution rules in order to configure the execution rules. For multiple operations, the operations may be applied selectively to a single parameter of the goal, or may be applied uniformly to a set of name value pairs or an array of parametric values. Goals, subgoals, and execution rules may have, for example, arithmetic or logical values, and operations may have, for example, arithmetic or logical operators.

The logic of operation execution need not be developed within the representation language. Operations may be executed using a spreadsheet and analysis program, a decision support system, or other suitable operation execution system. Representation module 62 may have tokens defined for the operation execution systems that call upon the corresponding operation execution systems to execute operations.

According to one example, operationalization workbench 40 receives a goal from a user and represents the goal in a representation language. The user selects an operation to partition the goal, and operationalization workbench 40 applies the operation to the goal. Alternatively, the user provides the subgoals, and operationalization workbench 40 applies an appropriate operation that partitions the goal into the provided subgoals. Operations are applied to the subgoals to configure execution rules in accordance with the subgoals. The resulting relationships among the goal, subgoals, execution rules, and operations are captured as operationalized knowledge by mapping the goal and the subgoals to the execution rules and associated parameter values.

If a modification is introduced to a goal, propagation engine 64 propagates the modification from the goal to the subgoals, according to the operation associated with partitioning the goal, in order to determine modifications of the subgoals. Propagation engine 64 propagates the modification from the subgoals to the execution rules, according to the operations used to configure the execution rules, to determine modifications of the execution rules.

According to one example, operationalization workbench 40 allows users to collaboratively operationalize a goal by providing information about users who have contributed to the collaboration, setting up workflows for approval for an operation, and rolling back operationalized knowledge to an earlier state in the event of an undesirable modification. Operationalization workbench 40 may, for example, record a user identifier associated with a user who created or modified the operationalized knowledge, a time when the procedure was performed, and the approval status of the procedure.

Operationalization workbench 40 may support commands that a user may issue to operationalize a goal. Example commands are presented below. Operationalization workbench 40, however, may support additional or alternative command suitable for operationalizing a goal.

Create Goal. A goal may be created by assigning values to parameters of the goal. A user may select a goal type from a list of goal types and assign values to create the goal. References to an external file that provides goal values may be used during creation of the goal. Upon creation, the goal is instantiated into a work session in which subsequent operations may be performed on the goal. Ownership of the goal is assigned to a user who creates the goal.

Find Goal. A previously saved goal may be retrieved. A parametric search by, for example, goal type, goal identifier, creator, creation date, modification date, or other parameter may be used to search for a goal. A user selects a goal from the search results. Upon selection, the latest version of the goal is brought into the current work session. The work session shows links to previous versions of the goal that may be used to retrieve the previous versions. Upon retrieval, a previous version may be launched into a separate work session.

Import Goal. A goal may be imported from a pre-defined system such as a contract management system, a business platform system, or a flat file. Upon import, a new goal is created and instantiated in a work session. Ownership of the goal may be assigned to a user who imports the goal.

Find Similar. Goals that are similar to a goal of a current work session with respect to specified similarity measures may be retrieved. Relative weights for each of the similarity measures may be specified. A list of similar goals for selection along with the corresponding similarity score may be displayed. Upon selection, the selected goal is instantiated in a separate work session.

Modify Goal. A goal may be modified. Typically, the parameters of the goal are modified. Upon modification, the goal stays in the work session with the modified values of the parameters.

Save Goal. A goal and the associated parameters of a current work session may be saved. Along with the goal, a unique identifier for the goal and information about the user who created the goal may be saved. After being saved, the goal remains in the work session. The save process may save a new version of the goal if modifications are made to the previous version.

Map to Execution Rules and Parameters. A goal may be mapped to the execution rules and parameters in order to capture operationalized knowledge. The mapping may be, for example, between the goal and the execution rules, or between subgoals and the execution rules.

Purge. Previous versions of a goal may be purged. Upon purging, versions of the goal except for the current one are deleted. Authorization of the user requesting the purge action may be determined before carrying out the purge action. For audit purposes, the purge action along with the user name and the time of the purge action may be recorded.

Commands may be used to apply operations such as transformations to goals. Commands may include, for example, the following.

Apply Transformations. An operation such as a transformation may be applied to a goal to, for example, generate subgoals, configure execution rules, or perform intermediate computations. A user may select a transformation that is applied to the goal. The goal may be saved as a new version that includes the specific transformation that was applied to the goal.

Introduce Parameters. Parameters may be added to a transformation applied to a goal. In certain cases, parameters may refer to an external file for goal values. An application that applies the transformation may access the goal values directly from the external file. If a goal is saved after introducing the parameters, the parameters are also saved.

Roll Back Transformation. An applied transformation may be rolled back if the results of the transformation are not satisfactory. Upon rollback, the goal goes to the state prior to the application of the transformation.

Cancel Transformation. A transformation may be cancelled while it is in progress. Upon cancellation of the transformation, the goal reverts to the state prior to the beginning of transformation.

Create Subgoals. Subgoals may be created from the results of a transformation. Links may be used to launch a subgoal in a separate work session.

Commands may be used to request approval for a goal. Commands may include, for example, the following.

Request Approval. Approval for a new or modified goal may be requested by a user. The user may specify an "approve by" time period, indicating that if the goal is not approved within the specified time period, the goal expires. Once an approval is requested, notification is sent to the approvers that there is a goal waiting for their approval. While the goal is in the approval process, the goal stays in an approval pending status. The approval hierarchy may depend upon, for example, a goal type or the modifier or creator of the goal.

Approve Goal. A goal may be approved, denied, or modified by an approver. Upon any of these actions, notification is sent to the user seeking approval. An approver may modify, save, and approve a goal. The approval may be tied to a version of the goal. Execution rules may state, for example, that only approved goals may be rolled out or assigned.

Request Review. Similar to approval, review of a goal by a reviewer may be requested, but the state of the goal does not change with the issue of a review request. Once a review is requested, notification is sent to a reviewer that there is a goal waiting for review. If a requested reviewer is not authorized to see the goal, the user is notified that the review request cannot be sent to the particular reviewer.

A command may be used to create a performance measure. The following command is an example.

Create Performance Measures. Transformations may be applied to performance measures of subgoals in order to determine performance measures for the goal.

Commands may be used to assign a goal. Commands may include, for example, the following.

Assign Goal. A user may assign a goal or subgoal to an assigned user. Whether a user is authorized to assign the goal to the assigned user and whether the assigned user is authorized to view the goal is determined. Upon assignment, notification is sent to the assigned user. The user assigning the goal may also specify a time period for the assigned user to accept or reject the goal. Notification of assignment related activities may be sent to specified users.

Cancel Assignment. Notification of assignment cancellation is sent to the users notified of the assignment.

Accept/Reject Goal. After receiving a goal assignment, an assigned user may accept or reject the goal. If the user does not act on the goal within the specified time period, a notification is sent to the assignee.

Commands may be used to view the operationalization of a goal. Commands may include, for example, the following.

View Transformations. A user may view transformations applied to a goal, chain through subgoals created from the goal, view transformations applied to the subgoals, and view a mapping from the goal to execution rules and parameters.

View Rules and Parameter Values. A library of execution rules and parameters, classified by functional types, may be displayed. For example, parameters and rules for price eligibility, product eligibility, or materials call-offs, may be displayed. If a parameter or rule is in use, it has an assigned value.

View Goals from Execution Rules and Parameters. Goals mapped to execution rules and parameters may be displayed. Multiple goals may be mapped to one parameter, where the roll-out of each goal modifies the parameter value. A list of goals associated with a parameter and corresponding change in value applied to the parameter may be shown. From this list, a goal may be selected to display the transformations applied to the goal. Other parameters associated with the goal or a parent goal and associated transformations may be determined.

Commands may be used to roll out a goal. Commands may include, for example, the following.

Schedule Rollout. A roll-out of a goal may be scheduled. If a goal is mapped to more than one execution rule or parameter, a phased roll-out execution rules or parameters may be scheduled, where each execution rule or parameter has its own activation schedule. Activation rules may state that the execution rules or parameters cannot be activated without authorization. At the time of activation of a parameter, the pre-activation values of the parameters being activated are saved.

Rollback Active Goal. An active goal may be fully or partially rolled back. Upon roll-back, the pre-activation values of the rules are restored. If the parameters have been altered by roll-out of another goal, then the goal is rolled back such that the goal is no longer active. If a goal is rolled back, then each of the subgoals is rolled back. The rollback may be applied to a goal or any of the subgoals in the hierarchy, allowing for a partial rollback.

Performance workbench 42 may be used to monitor performance of execution systems 23 and evaluate the performance with respect to a goal. Performance workbench 42 allows a user to specify how transactions resulting from execution systems 23 are to be aggregated, filtered, and grouped. Performance data may be linked to one or more goals, subgoals, or execution rules and may be evaluated with respect to the goal, subgoal, or execution rule linked to the performance data. Performance data linked to a goal may be determined by applying a transformation to the performance data linked to a subgoal, and performance data linked to the subgoal may be determined by applying a transformation to performance data linked an execution rule. Performance workbench 42 may perform operations on the performance data such as normalization, filtering, and partitioning, and may be used to form parameterized queries into, for example, aggregated performance data, pre-operationalization data, or operationalization relationships.

Analysis workbench 44 may be used to analyze configurations of execution rules that may be used to satisfy a goal. A history 64 of operationalized goals may describe the configurations. Search techniques such as a genetic algorithm may be applied to history 64 to determine configurations that may satisfy a goal. Performance data stored in history 64 may also be used to determine the configurations that may satisfy a goal. For example, an optimization procedure may be performed on the performance data in order to determine an optimized configuration.

Administrator workbench 46 may be used to provide commands for system maintenance and enhancement. Commands may include, for example, the following.

Add, Modify, Delete Transformation Types. Transformation types may be added to a set of existing transformation types, and transformation types of the set may be modified, deactivated, or deleted. A new transformation type may be designed using a model definition tool, and may be checked for validity.

Add, Modify, Delete Goal Types. Goal types may be added to a set of existing goals types, and goal types of the set may be modified, deactivated, or deleted. A new goal type may be designed using a model definition tool, and may be checked for validity.

Add, Modify, Delete Execution Rules. Execution rules and parameters may be added, modified, or deleted.

Add, Modify, Delete Users. New users may be added, the attributes of existing users may be modified, or existing users may be deleted.

Manage User Authority. The authority structure for goals or goal types may be modified. For example, a user may be added to or removed from an approvers list for a goal type, or the authority for a user to view, create, modify, or assign goals of a goal type may be modified.

Service modules 32 include modules that may be used by workbenches 30, for example, a knowledge retrieval engine 50, a model definition tool 51, a workflow manager 52, and one or more adapters 54. Service modules 32 may include additional or alternative modules suitable for providing services to workbenches 30, such as a security module. Knowledge retrieval engine 50 may be used to search for and retrieve data from database 24. Knowledge retrieval engine 50 may, for example, provide information for operationalizing a goal to a user by retrieving information about how similar goals have been operationalized. The user may learn how similar goals have been partitioned into subgoals, what transformations were applied to them during partitioning, and how the transformations were applied. Similarity measures may be used to search for similar operationalization cases.

Model definition tool 51 may be used to express models for new goals, transformations, or execution rules. Model definition tool 51 may process a model expression, check its structural validity, and generate the models. Model definition tool 51 may also generate adapters for importing goals.

Workflow manager 52 may be used to develop and manage workflows for operationalizing a goal. Workflows may include, for example, authorization workflows for reviewing, modifying, and approving goals, rollout workflows for rolling out goals or goal modifications, or notification workflows for sending notifications if, for example, there is a problem with an operationalization or if performance data reaches a threshold. Workflow manager 52 may be used to capture events such as timer based, user action based, or parameter threshold based events and to trigger workflows in response to capturing the events. New workflows may be developed using workflow manager 52.

Adapters 54 may be used by server system 22 to communicate with other systems. Adapters 54 may include input adapters for receiving input from a user or a computer. An adapter 54 may be used to, for example, populate terms and parameters for execution systems 23 during a rollout. An adapter 54 may have settings that a user can use to specify, for example, when to perform a rollout or what action to take if there is a problem. An adapter 54 may be used to import pre-defined accruals from execution systems 23 such as order management, payment management, supply chain planning, logistics planning, transportation management, and forecasting systems. Importing goals and corresponding transformations during the deployment phase may be performed by an adapter 54. Adapters 54 may include other adapters 54 suitable for communicating with other systems.

Execution systems 23 may include, for example, planning modules 80 and management modules 82. Planning modules 80 may include, for example, supply chain planning, logistics planning, and demand forecasting modules. Management modules 82 may include, for example, order management, payment management, and transportation management modules. Execution systems 23, however, may include other suitable execution systems operable to perform functions to satisfy a goal, such as a product sourcing module.

Database 24 includes operationalized knowledge 60 and history 64. Operationalized knowledge 60 records a goal 70 that has been operationalized, subgoals 72 partitioned from goal 70, execution rules 74 configured according to subgoals 72, operations 76 used to partition goal 70 to form subgoals 72, and operations 76 used to configure execution rules 74. Goal 70 may be associated with information such as an identifier, description, creator identifier, creation time, goal type, a higher level goal from which the goal was derived, the transformation used to derive the goal from the higher level goal, a user assignment identifying a user to whom the goal is assigned, goal status, and validity. A goal may be associated with one or more parameters that take on values. The parameters may comprise, for example, numbers or arrays of name-pair values.

History 64 may include information about previously operationalized goals such as the configuration of a goal, subgoals, execution rules, and operations used to operationalize a goal. History 64 may include performance data for operationalized goals. Analysis workbench 44 may use history 64 to analyze configurations of execution rules that may be used to satisfy a goal.

According to one example, system 10 may provide operationalization for a high level goal or contractual obligation that is to be rolled out across multiple divisions. Before the goal is rolled out, it may need to go through multiple levels of delegation, where at each level the goal is translated into one or more subgoals, and translated into a set of execution rules for one or more execution systems.

Figure 2:
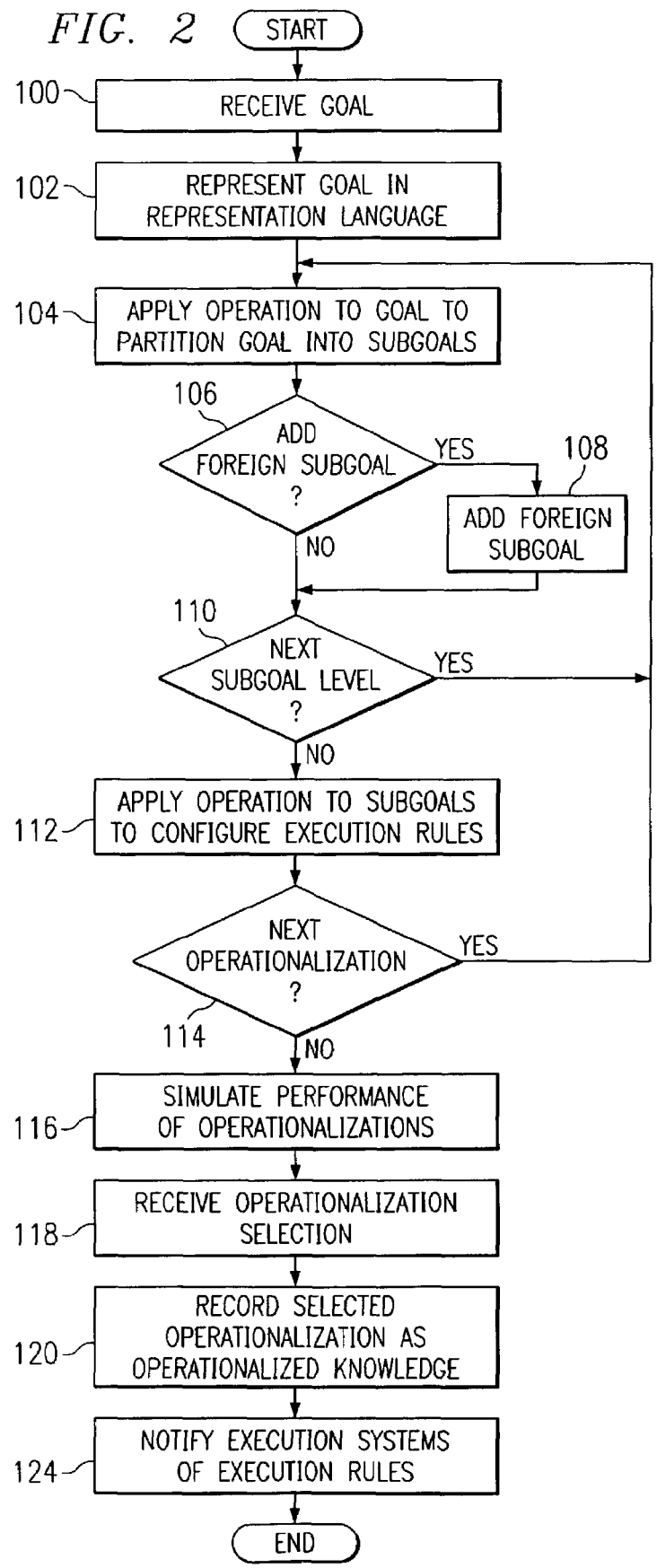
FIG. 2 is a flowchart illustrating an example method for operationalizing a goal.

FIG. 2 is a flowchart illustrating an example method for operationalizing a goal. The method begins at step 100, where operationalization workbench 40 receives a goal to be operationalized. The goal may comprise, for example, a goal for a company to increase sales by twelve percent. The goal may be received from database 24, or may be generated according to user input into client system 20. A user may, for example, construct the goal by inserting values into the fields of a goal type. Representation module 62 represents the goal in a representation language at step 102. Representation language includes operations such as transformations that may be applied to the goal.

An operation is applied to the goal to partition the goal into subgoals at step 104. For example, the goal for a company may be partitioned into subgoals for each division of a company. A goal of increasing sales by twelve percent may be partitioned into subgoals of increasing sales by four percent for each of three divisions. At step 106, foreign subgoals may be added to the subgoals resulting from partitioning. For example, a foreign subgoal of increasing advertising may be added to the subgoals of increasing sales by four percent at each division. If a foreign subgoal is to be added, the method proceeds to step 108, where an operation is used to add the subgoal. If a foreign subgoal is not to be added, the method proceeds to step 110, where operationalization workbench 40 determines whether there is a next subgoal level. For example, subgoals may be defined for subdivisions of the divisions of a company. If there is a next subgoal level, operationalization workbench 40 returns to step 104 to apply an operation to the next subgoal to partition the subgoals into more subgoals. If there is no next subgoal level, operationalization workbench 40 proceeds to step 112.

One or more operations are applied to the subgoals to configure execution rules at step 112. In addition, execution rules may be directly configured from a goal instead of a subgoal. An operation may comprise, for example, a transformation that may be applied to parameters of the subgoal in order to determine parameters for the execution rules. The configured execution rules may include information that execution systems 23 may use to satisfy the goal.

Multiple operationalizations of a goal may be performed. Performance of the operationalizations may be simulated, and an operationalization may be selected in response to the simulated performances. Operationalization workbench 40 determines whether there is a next operationalization at step 114. If there is a next operationalization, operationalization workbench 40 returns to step 104 to apply an operation to the goal to partition the goal into subgoals. If there is no next operationalization, operationalization workbench 40 proceeds to step 116 to simulate performance of the operationalizations.

A user may select an operationalization in response to the simulated performance. Operationalization workbench 40 receives the operationalization selection at step 118. The selected operationalization is recorded as operationalized knowledge 60 in database 24 at step 120. Operationalized knowledge 60 may comprise, for example, goal 70, subgoals 72, execution rules 74, and operations 76. Operationalization workbench 40 notifies execution systems 23 of execution rules 74 at step 122. Execution systems 23 may use the execution rules that are configured to satisfy the operationalized goal. After operationalization workbench 40 notifies execution systems 23, the method ends.

Figure 3:
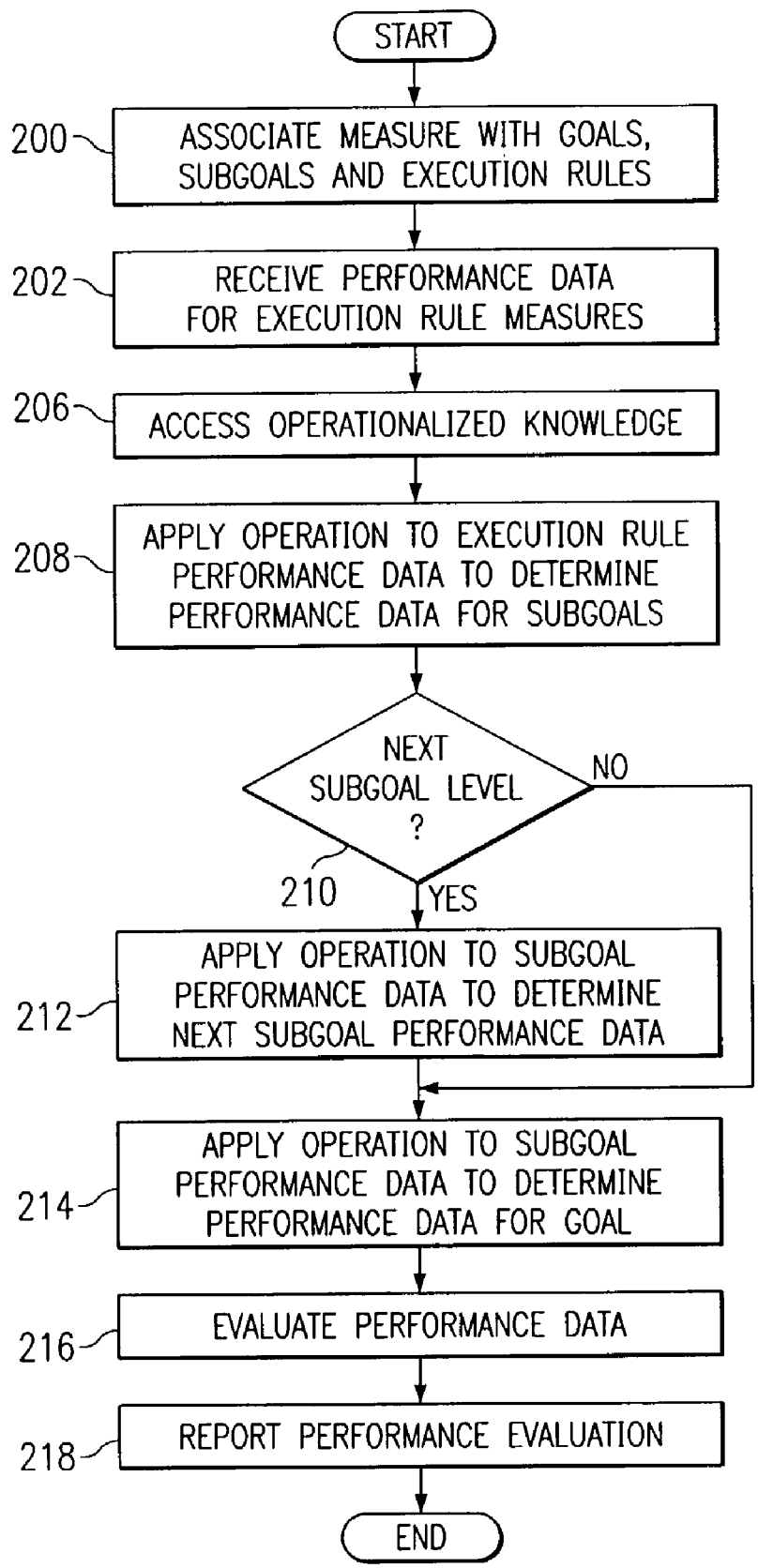
FIG. 3 is a flowchart illustrating an example method for evaluating performance of execution systems with respect to an operationalized goal.

FIG. 3 is a flowchart illustrating an example method for evaluating performance of execution systems 23 with respect to an operationalized goal. The method begins at step 200, where performance workbench 42 associates measures with execution rules. The measures are used to measure the performance of execution systems 23 associated with the execution rules. For example, measuring the number of products shipped each week may be associated with an execution rule stating that one hundred items are to be shipped each week in order to assess the performance of a transportation execution system 23. The association is captured in operationalized knowledge 60.

Performance data for the measures associated with the execution rules is received at step 202. Performance data may include, for example, the number of items shipped per week. Operationalized knowledge 60 is accessed at step 206. Operationalized knowledge 60 includes operations that may be applied to the performance data for the execution rules in order to determine performance for the subgoals. Transformations are applied to the performance data for the execution rules at step 208 to determine the performance for the subgoals. For example, execution rule performance data stating that one hundred items were shipped each week may generate subgoal performance data stating that sales have increased by four percent.

Performance workbench 42 determines whether there is a next subgoal level at step 210. If there is a next subgoal level, performance workbench 42 proceeds to step 212. At step 212, performance workbench 42 applies an operation to the subgoal performance data to determine the next subgoal performance data, and then proceeds to step 214. If there is no next subgoal level, performance workbench 42 proceeds directly to step 214.

Performance workbench 42 applies an operation to subgoal performance data at step 214 to determine performance for the goal. For example, subgoal performance data stating that the sales at each of three divisions have increased by four percent is translated to the goal performance data stating that sales have increased by twelve percent. The performance data is evaluated at step 216. For example, the performance data of the goal may be compared with the goal itself. Performance data for the subgoals may also be compared with the subgoals themselves. Performance workbench 42 reports the performance evaluation at step 218, and the method ends.

Figure 4:
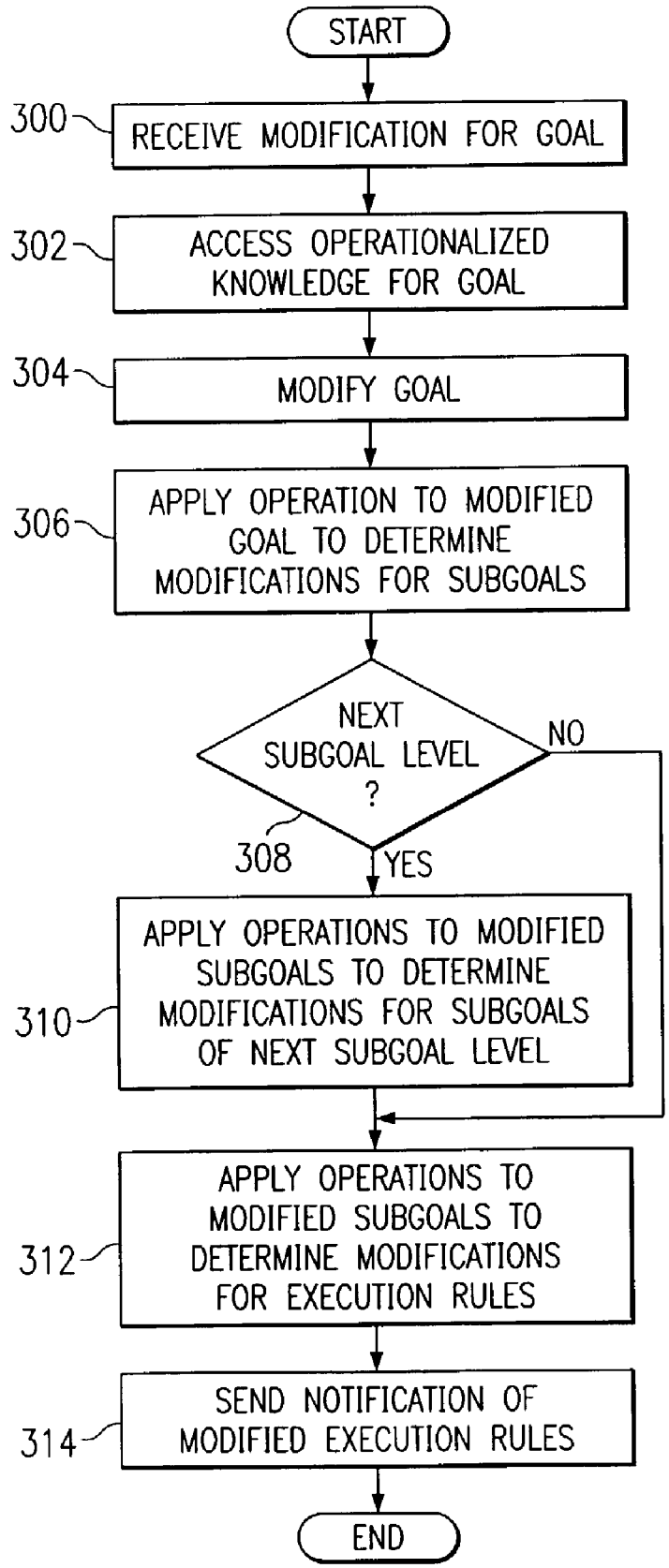
FIG. 4 is a flowchart illustrating an example method for modifying an operationalized goal.

FIG. 4 is a flowchart illustrating an example method for modifying an operationalized goal. According to the method, operationalization workbench 40 receives a modification for an operationalized goal, determines associated modifications for the subgoals and execution rules, and notifies execution systems 23 of the modified execution rules. The method begins at step 300, where operationalization workbench 40 receives a modification for an operationalized goal. The modification may be received from a user at client system 20. Operationalization workbench 40 accesses operationalized knowledge 60 for the goal at step 302. The goal is modified according to the received modification at step 304. An operation associated with goal is applied to the modified goal to determine modifications for subgoals.

Propagation engine 64 determines whether there is a next subgoal level at step 308. If there is a next subgoal level, propagation engine 64 proceeds to step 310 to apply operations to the subgoals to determine modifications for the subgoals of the next level, and then proceeds to step 312. If there is no next subgoal level, propagation engine 64 proceeds directly to step 312.

At step 312, operations are applied to the modified subgoals to determine modifications of the execution rules. Operationalization workbench 40 sends notification of the modified execution rules at step 314. The notification may be sent to execution systems 23 or to users responsible for implementing the changes in execution systems 23. After operationalization workbench 40 sends the notification, the method ends.

Certain examples of the invention may provide one or more technical advantages. A technical advantage of one example may be that a goal is partitioned into one or more subgoals, which may be used to configure execution rules for execution systems in accordance with the goal. An operation may be applied to a goal to partition the goal into subgoals, and operations may be applied to the subgoals to configure the execution rules. Another technical advantage of one example may be that the relationships between the goals, subgoals, and execution rules are captured as operationalized knowledge. The operationalized knowledge may record the operation applied to the goal to partition the goal into subgoals, and the operations applied to subgoals to configure the execution rules.

Another technical advantage of one example may be that operationalized knowledge may be used to determine how a modification of the goal generates modifications for the subgoals and execution rules. Another technical advantage of one example may be that the operationalized knowledge may be used to determine performance data for a goal from performance data for an execution rule. Examples of the invention may include none, some, or all of these technical advantages. One or more other technical advantages may be readily apparent to one skilled in the art from the figures, descriptions, and claims included herein.

Although an example of the invention and its advantages are described in detail, a person skilled in the art could make various alterations, additions, and omissions without departing from the spirit and scope of the present invention as defined by the appended claims.

What is claimed is:

1. A method for operationalizing a goal, comprising:
   receiving the goal and a plurality of execution rules associated with the goal, each execution rule corresponding to an execution system for initiating execution of the execution rule;
   representing the goal in a representation language comprising a set of operations;
   applying an operation of the set of operations to the goal to partition the goal into a plurality of subgoals;
   responsive to a determination that a foreign goal exists, introducing the foreign goal as a subgoal, the foreign goal being independent of application of an operation of the set of operations to the goal;
   for each subgoal, applying an operation of the set of operations to the subgoal to derive and configure an execution rule associated with the subgoal;
   recording the goals, the applied operations, the subgoals, and the execution rules as operationalized knowledge to operationalize the goal:
   receiving a goal modification associated with the goal: and
   propagating the goal modification from the goal to the subgoals according to the operationalized knowledge to determine a subgoal modification associated with a specific subgoal.

2. The method of claim 1, wherein:
   representing the goal in the representation language comprises assigning a value to a goal parameter associated with the goal;
   applying an operation of the set of operations to the goal to partition the goal into the subgoals comprises, for each subgoal, determining a value for a subgoal parameter associated with the subgoal in accordance with the operation and the value of the goal parameter; and
   applying an operation of the set of operations to the subgoal to configure an execution rule associated with the subgoal comprises, for each execution rule, determining a value for an execution rule parameter associated with the execution rule in accordance with the operation and the value of the subgoal parameter.

3. The method of claim 1, further comprising notifying each execution system of the configured execution rule associated with the execution system.

4. The method of claim 1, wherein applying an operation of the set of operations to the goal to partition the goal into the subgoals comprises:
   identifying an operation previously applied to the goal; and
   applying to the goal the operation previously applied to the goal.

5. The method of claim 1, wherein applying an operation of the set of operations to the goal to partition the goal into the subgoals comprises:
   identifying an operation that optimizes the goal; and
   applying the operation that optimizes the goal to the goal.

6. The method of claim 1, further comprising:
   propagating the subgoal modification from the specific subgoal to its associated execution rule according to the operationalized knowledge to determine an execution rule modification associated with the execution rule.

7. The method of claim 1, further comprising:
   propagating the subgoal modification from the specific subgoal to its associated execution rule according to the operationalized knowledge to determine an execution rule modification associated with the execution rule; and
   notifying the execution system associated with the execution rule of the execution rule modification.

8. The method of claim 1, further comprising:
   receiving performance data corresponding to an execution rule; and
   determining performance data corresponding to a subgoal associated with the execution rule according to the operationalized knowledge.

9. The method of claim 1, further comprising:
   receiving performance data corresponding to an execution rule;
   determining performance data corresponding to a subgoal associated with the execution rule according to the operationalized knowledge; and
   determining performance data corresponding to the goal according to the operationalized knowledge.

10. A system for operationalizing a goal, comprising:
    a database operable to store the goal and a plurality of execution rules associated with the goal, each execution rule corresponding to an execution system for initiating execution of the execution rule; and
    a server system coupled to the database and operable to:
      represent the goal in a representation language comprising a set of operations;
      apply an operation of the set of operations to the goal to partition the goal into a plurality of subgoals;
      responsive to a determination that a foreign goal exists, introduce the foreign goal as a subgoal, the foreign goal being independent of application of an operation of the set of operations to the goal;
      for each subgoal, apply an operation of the set of operations to the subgoal to derive and configure an execution rule associated with the subgoal; and
      record the goals, the applied operations, the subgoals, and the execution rules as operationalized knowledge to operationalize the goal;
      receive a goal modification associated with the goal; and
      propagate the goal modification from the goal to the subgoals according to the operationalized knowledge to determine a subgoal modification associated with a specific subgoal.

11. The system of claim 10, wherein the server system is operable to:
    represent the goal in the representation language by assigning a value to a goal parameter associated with the goal;
    apply an operation of the set of operations to the goal to partition the goal into the subgoals by, for each subgoal, determining a value for a subgoal parameter 20 associated with the subgoal in accordance with the operation and the value of the goal parameter; and apply an operation of the set of operations to the subgoal to configure an execution rule associated with the subgoal by, for each execution rule, determining a value for an execution rule parameter associated with the execution rule in accordance with the operation and the value of the subgoal parameter.

12. The system of claim 10, wherein the server system is operable to notify each execution system of the configured execution rule associated with the execution system.

13. The system of claim 10, wherein the server system is operable to apply an operation of the set of operations to the goal to partition the goal into the subgoals by:

identifying an operation previously applied to the goal; and applying to the goal the operation previously applied to the goal.

14. The system of claim 10, wherein the server system is operable to apply an operation of the set of operations to the goal to partition the goal into the subgoals by:

identifying an operation that optimizes the goal; and applying the operation that optimizes the goal to the goal.

15. The system of claim 10, wherein the server system is operable to:

propagate the subgoal modification from the specific subgoal to its associated execution rule according to the operationalized knowledge to determine an execution rule modification associated with the execution rule.

16. The system of claim 10, wherein the server system is operable to:

propagate the subgoal modification from the specific subgoal to its associated execution rule according to the operationalized knowledge to determine an execution rule modification associated with the execution rule; and notify the execution system associated with the execution rule of the execution rule modification.

17. The system of claim 10, wherein the server system is operable to:

receive performance data corresponding to an execution rule; and determine performance data corresponding to a subgoal associated with the execution rule according to the operationalized knowledge.

18. The system of claim 10, wherein the server system is operable to:

receive performance data corresponding to an execution rule;

determine performance data corresponding to a subgoal associated with the execution rule according to the operationalized knowledge; and determine performance data corresponding to the goal according to the operationalized knowledge.

19. Software for operationalizing a goal, the software embodied in a computer-readable medium and, when executed on a computer system comprising one or more processing units and one or more memory units, operable to:

receive the goal and a plurality of execution rules associated with the goal, each execution rule corresponding to an execution system for initiating execution of the execution rule;

represent the goal in a representation language comprising a set of operations;

apply an operation of the set of operations to the goal to partition the goal into a plurality of subgoals;

responsive to a determination that a foreign goal exists, introduce the foreign goal as a subgoal, the foreign goal being independent of application of an operation of the set of operations to the goal;

for each subgoal, apply an operation of the set of operations to the subgoal to derive and configure an execution rule associated with the subgoal; and record the goals, the applied operations, the subgoals, and the execution rules as operationalized knowledge to operationalize the goal:

receive a goal modification associated with the goal: and propagate the goal modification from the goal to the subgoals according to the operationalized knowledge to determine a subgoal modification associated with a specific subgoal.

20. The software of claim 19, operable to:

represent the goal in the representation language by assigning a value to a goal parameter associated with the goal;

apply an operation of the set of operations to the goal to partition the goal into the subgoals by, for each subgoal, determining a value for a subgoal parameter associated with the subgoal in accordance with the operation and the value of the goal parameter; and apply an operation of the set of operations to the subgoal to configure an execution rule associated with the subgoal by, for each execution rule, determining a value for an execution rule parameter associated with the execution rule in accordance with the operation and the value of the subgoal parameter.

21. The software of claim 19, operable to notify each execution system of the configured execution rule associated with the execution system.

22. The software of claim 19, operable to apply an operation of the set of operations to the goal to partition the goal into the subgoals by:

identifying an operation previously applied to the goal; and applying to the goal the operation previously applied to the goal.

23. The software of claim 19, operable to apply an operation of the set of operations to the goal to partition the goal into the subgoals by:

identifying an operation that optimizes the goal; and applying the operation that optimizes the goal to the goal.

24. The software of claim 19, operable to:

propagate the subgoal modification from the specific subgoal to its associated execution rule according to the operationalized knowledge to determine an execution rule modification associated with the execution rule.

25. The software of claim 19, operable to:

propagate the subgoal modification from the specific subgoal to its associated execution rule according to the operationalized knowledge to determine an execution rule modification associated with the execution rule; and notify the execution system associated with the execution rule of the execution rule modification.

26. The software of claim 19, operable to:

receive performance data corresponding to an execution rule; and determine performance data corresponding to a subgoal associated with the execution rule according to the operationalized knowledge.

27. The software of claim 19, operable to:

receive performance data corresponding to an execution rule;

determine performance data corresponding to a subgoal associated with the execution rule according to the operationalized knowledge; and determine performance data corresponding to the goal according to the operationalized knowledge.

28. A system for generating an optimized supplier allocation plan, comprising:

means for receiving a goal and a plurality of execution rules associated with the goal, each execution rule corresponding to an execution system for initiating execution of the execution rule;

means for representing the goal in a representation language comprising a set of operations;

means for applying an operation of the set of operations to the goal to partition the goal into a plurality of subgoals;

responsive to a determination that a foreign goal exists, means for introducing the foreign goal as a subgoal, the foreign goal being independent of application of an operation of the set of operations to the goal;

for each subgoal, means for applying an operation of the set of operations to the subgoal to derive and configure an execution rule associated with the subgoal;

means for recording the goals, the applied operations, the subgoals, and the execution rules as operationalized knowledge to operationalize the goal:

means for receiving a goal modification associated with the goal: and means for propagating the goal modification from the goal to the subgoals according to the operationalized knowledge to determine a subgoal modification associated with a specific subgoal.

29. A method for generating an optimized supplier allocation plan, comprising:

receiving a goal and a plurality of execution rules associated with the goal, each execution rule corresponding to an execution system for initiating execution of the execution rule;

representing the goal in a representation language comprising a set of operations by assigning a value to a goal parameter associated with the goal;

identifying an operation of the set of operations that optimizes the goal;

applying the operation that optimizes the goal to the goal to partition the goal into a plurality of subgoals by, for each subgoal, determining a value for a subgoal parameter associated with the subgoal in accordance with the operation and the value of the goal parameter;

introducing a foreign goal as a subgoal, the foreign goal being independent of application of an operation of the set of operations to the goal;

for each subgoal, applying an operation of the set of operations to the subgoal to derive and configure an execution rule associated with the subgoal by, for each execution rule, determining a value for an execution rule parameter associated with the execution rule in accordance with the operation and the value of the subgoal parameter;

recording the goals, the applied operations, the subgoals, and the execution rules as operationalized knowledge to operationalize the goal, and notifying each execution system of the configured execution rule associated with the execution system;

receiving a goal modification associated with the goal, and propagating the goal modification from the goal to the subgoals according to the operationalized knowledge to determine a subgoal modification associated with a specific subgoal;

propagating the subgoal modification from the specific subgoal to its associated execution rule according to the operationalized knowledge to determine an execution rule modification associated with the execution rule;

notifying the execution system associated with the execution rule of the execution rule modification; and receiving performance data corresponding to an execution rule, and determining performance data corresponding to a subgoal associated with the execution rule according to the operationalized knowledge, and determining performance data corresponding to the goal according to the operationalized knowledge.

* * * * *

UNITED STATES PATENT AND TRADEMARK OFFICE
CERTIFICATE OF CORRECTION

PATENT NO. : 7,383,240 B2
APPLICATION NO. : 10/308333
DATED : December 2, 2002
INVENTOR(S) : Vijay Mital et al.

It is certified that error appears in the above-identified patent and that said Letters Patent is hereby corrected as shown below:

Col. 11 please replace Claim 1, with the following:

1. A method for operationalizing a goal, comprising:
receiving that goal and a plurality of execution rules associated with the goal, each execution rule corresponding to an execution system for initiating execution of the execution rule;
representing the goal in a representation language comprising a set of operations;
applying an operation of the set of operations to the goal to partition the goal into a plurality of subgoals;
responsive to a determination that a foreign goal exists, introducing the foreign goal as a subgoal, the foreign goal being independent of application of an operation of the set of operations to the goal;
for each subgoal, applying an operation of the set of operations to the subgoal to derive and configure an execution rule associated with the subgoal;
recording the goals, the applied operations, the subgoals, and the execution rules as operationalized knowledge to operationalize the goal;
receiving a goal modification associated with the goal; and
propagating the goal modification from the goal to the subgoals according to the operationalized knowledge to determine a subgoal modification associated with a specific subgoal.

Col. 12 please replace Claim 10, with the following:

10. A system for operationalizing a goal, comprising:
a database operable to store the goal and a plurality of execution rules associated with the goal, each execution rule corresponding to an execution system for initiating execution of the execution rule; and
a server system coupled to the database and operable to:
represent the goal in a representation language comprising a set of operations;
apply an operation of the set of operations to the goal to partition the goal into a plurality of subgoals;
responsive to a determination that a foreign goal exists, introduce the foreign goal as a subgoal, the foreign goal being independent of application of an operation of the set of operations to the goal;
for each subgoal, apply an operation of the set of operations to the subgoal to derive and configure an execution rule associated with the subgoal;
record the goals, the applied operations, the subgoals, and the execution rules as operationalized knowledge to operationalize the goal;
receive a goal modification associated with the goal; and
propagate the goal modification from the goal to the subgoals according to the

UNITED STATES PATENT AND TRADEMARK OFFICE
CERTIFICATE OF CORRECTION

| | | |
|---|---|---|
| PATENT NO. | : 7,383,240 B2 | |
| APPLICATION NO. | : 10/308333 | |
| DATED | : December 2, 2002 | |
| INVENTOR(S) | : Vijay Mital et al. | |

It is certified that error appears in the above-identified patent and that said Letters Patent is hereby corrected as shown below:

operationalized knowledge to determine a subgoal modification associated with a specific subgoal.

Col. 13-14 please replace Claim 19, with the following:

19. Software for operationalizing a goal, the software embodied in a computer-readable medium and, when executed on a computer system comprising one or more processing units and one or more memory units, operable to:
 receive the goal and a plurality of execution rules associated with the goal, each execution rule corresponding to an execution system for initiating execution of the execution rule;
 represent the goal in a representation language comprising a set of operations;
 apply an operation of the set of operations to the goal to partition the goal into a plurality of subgoals;
 responsive to a determination that a foreign goal exists, introduce the foreign goal as a subgoal, the foreign goal being independent of application of an operation of the set of operations to the goal;
 for each subgoal, apply an operation of the set of operations to the subgoal to derive and configure an execution rule associated with the subgoal;
 record the goals, the applied operations, the subgoals, and the execution rules as operationalized knowledge to operationalize the goal;
 receive a goal modification associated with the goal; and
 propagate the goal modification from the goal to the subgoals according to the operationalized knowledge to determine a subgoal modification associated with a specific subgoal.

UNITED STATES PATENT AND TRADEMARK OFFICE
CERTIFICATE OF CORRECTION

PATENT NO. : 7,383,240 B2
APPLICATION NO. : 10/308333
DATED : December 2, 2002
INVENTOR(S) : Vijay Mital et al.

It is certified that error appears in the above-identified patent and that said Letters Patent is hereby corrected as shown below:

Col. 15 please replace Claim 28, with the following:

28. A system for generating an optimized supplier allocation plan, comprising:
means for receiving a goal and a plurality of execution rules associated with the goal, each execution rule corresponding to an execution system for initiating execution of the execution rule;
means for representing the goal in a representation language comprising a set of operations;
means for applying an operation of the set of operations to the goal to partition the goal into a plurality of subgoals;
responsive to a determination that a foreign goal exists, means for introducing the foreign goal as a subgoal, the foreign goal being independent of application of an operation of the set of operations to the goal;
for each subgoal, means for applying an operation of the set of operations to the subgoal to derive and configure an execution rule associated with the subgoal;
means for recording the goals, the applied operations, the subgoals, and the execution rules as operationalized knowledge to operationalize the goal;
means for receiving a goal modification associated with the goal; and
means for propagating the goal modification from the goal to the subgoals according to the operationalized knowledge to determine a subgoal modification associated with a specific subgoal.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,383,240 B2 |
| APPLICATION NO. | : 10/308333 |
| DATED | : December 2, 2002 |
| INVENTOR(S) | : Vijay Mital et al. |

It is certified that error appears in the above-identified patent and that said Letters Patent is hereby corrected as shown below:

Col. 11 please replace Claim 1, lines 18-42, with the following:

1. A method for operationalizing a goal, comprising:
receiving that goal and a plurality of execution rules associated with the goal, each execution rule corresponding to an execution system for initiating execution of the execution rule;
representing the goal in a representation language comprising a set of operations;
applying an operation of the set of operations to the goal to partition the goal into a plurality of subgoals;
responsive to a determination that a foreign goal exists, introducing the foreign goal as a subgoal, the foreign goal being independent of application of an operation of the set of operations to the goal;
for each subgoal, applying an operation of the set of operations to the subgoal to derive and configure an execution rule associated with the subgoal;
recording the goals, the applied operations, the subgoals, and the execution rules as operationalized knowledge to operationalize the goal;
receiving a goal modification associated with the goal; and
propagating the goal modification from the goal to the subgoals according to the operationalized knowledge to determine a subgoal modification associated with a specific subgoal.

Col. 12 please replace Claim 10, lines 33-59, with the following:

10. A system for operationalizing a goal, comprising:
a database operable to store the goal and a plurality of execution rules associated with the goal, each execution rule corresponding to an execution system for initiating execution of the execution rule; and
a server system coupled to the database and operable to:
represent the goal in a representation language comprising a set of operations;
apply an operation of the set of operations to the goal to partition the goal into a plurality of subgoals;
responsive to a determination that a foreign goal exists, introduce the foreign goal as a subgoal, the foreign goal being independent of application of an operation of the set of operations to the goal;
for each subgoal, apply an operation of the set of operations to the subgoal to derive and configure an execution rule associated with the subgoal;
record the goals, the applied operations, the subgoals, and the execution rules as operationalized knowledge to operationalize the goal;
receive a goal modification associated with the goal; and
propagate the goal modification from the goal to the subgoals according to the

UNITED STATES PATENT AND TRADEMARK OFFICE
CERTIFICATE OF CORRECTION

PATENT NO.       : 7,383,240 B2
APPLICATION NO.  : 10/308333
DATED            : December 2, 2002
INVENTOR(S)      : Vijay Mital et al.

It is certified that error appears in the above-identified patent and that said Letters Patent is hereby corrected as shown below:

operationalized knowledge to determine a subgoal modification associated with a specific subgoal.

Col. 13, line 56 thru Column 14, line 15, please replace Claim 19, with the following:

19. Software for operationalizing a goal, the software embodied in a computer-readable medium and, when executed on a computer system comprising one or more processing units and one or more memory units, operable to:
receive the goal and a plurality of execution rules associated with the goal, each execution rule corresponding to an execution system for initiating execution of the execution rule;
represent the goal in a representation language comprising a set of operations;
apply an operation of the set of operations to the goal to partition the goal into a plurality of subgoals;
responsive to a determination that a foreign goal exists, introduce the foreign goal as a subgoal, the foreign goal being independent of application of an operation of the set of operations to the goal;
for each subgoal, apply an operation of the set of operations to the subgoal to derive and configure an execution rule associated with the subgoal;
record the goals, the applied operations, the subgoals, and the execution rules as operationalized knowledge to operationalize the goal;
receive a goal modification associated with the goal; and
propagate the goal modification from the goal to the subgoals according to the operationalized knowledge to determine a subgoal modification associated with a specific subgoal.

UNITED STATES PATENT AND TRADEMARK OFFICE
CERTIFICATE OF CORRECTION

PATENT NO. : 7,383,240 B2
APPLICATION NO. : 10/308333
DATED : December 2, 2002
INVENTOR(S) : Vijay Mital et al.

It is certified that error appears in the above-identified patent and that said Letters Patent is hereby corrected as shown below:

Col. 15 please replace Claim 28, lines 6-32, with the following:

28. A system for generating an optimized supplier allocation plan, comprising:
means for receiving a goal and a plurality of execution rules associated with the goal, each execution rule corresponding to an execution system for initiating execution of the execution rule;
means for representing the goal in a representation language comprising a set of operations;
means for applying an operation of the set of operations to the goal to partition the goal into a plurality of subgoals;
responsive to a determination that a foreign goal exists, means for introducing the foreign goal as a subgoal, the foreign goal being independent of application of an operation of the set of operations to the goal;
for each subgoal, means for applying an operation of the set of operations to the subgoal to derive and configure an execution rule associated with the subgoal;
means for recording the goals, the applied operations, the subgoals, and the execution rules as operationalized knowledge to operationalize the goal;
means for receiving a goal modification associated with the goal; and
means for propagating the goal modification from the goal to the subgoals according to the operationalized knowledge to determine a subgoal modification associated with a specific subgoal.

This certificate supersedes the Certificate of Correction issued August 19, 2008.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

PATENT NO.        : 7,383,240 B2
APPLICATION NO.   : 10/308333
DATED             : June 3, 2008
INVENTOR(S)       : Vijay Mital et al.

It is certified that error appears in the above-identified patent and that said Letters Patent is hereby corrected as shown below:

Col. 11 please replace Claim 1, lines 18-42, with the following:

1. A method for operationalizing a goal, comprising:
receiving that goal and a plurality of execution rules associated with the goal, each execution rule corresponding to an execution system for initiating execution of the execution rule;
representing the goal in a representation language comprising a set of operations;
applying an operation of the set of operations to the goal to partition the goal into a plurality of subgoals;
responsive to a determination that a foreign goal exists, introducing the foreign goal as a subgoal, the foreign goal being independent of application of an operation of the set of operations to the goal;
for each subgoal, applying an operation of the set of operations to the subgoal to derive and configure an execution rule associated with the subgoal;
recording the goals, the applied operations, the subgoals, and the execution rules as operationalized knowledge to operationalize the goal;
receiving a goal modification associated with the goal; and
propagating the goal modification from the goal to the subgoals according to the operationalized knowledge to determine a subgoal modification associated with a specific subgoal.

Col. 12 please replace Claim 10, lines 33-59, with the following:

10. A system for operationalizing a goal, comprising:
a database operable to store the goal and a plurality of execution rules associated with the goal, each execution rule corresponding to an execution system for initiating execution of the execution rule; and
a server system coupled to the database and operable to:
represent the goal in a representation language comprising a set of operations;
apply an operation of the set of operations to the goal to partition the goal into a plurality of subgoals;
responsive to a determination that a foreign goal exists, introduce the foreign goal as a subgoal, the foreign goal being independent of application of an operation of the set of operations to the goal;
for each subgoal, apply an operation of the set of operations to the subgoal to derive and configure an execution rule associated with the subgoal;
record the goals, the applied operations, the subgoals, and the execution rules as operationalized knowledge to operationalize the goal;
receive a goal modification associated with the goal; and
propagate the goal modification from the goal to the subgoals according to the

UNITED STATES PATENT AND TRADEMARK OFFICE
CERTIFICATE OF CORRECTION

| | | |
|---|---|---|
| PATENT NO. | : 7,383,240 B2 | |
| APPLICATION NO. | : 10/308333 | |
| DATED | : June 3, 2008 | |
| INVENTOR(S) | : Vijay Mital et al. | |

It is certified that error appears in the above-identified patent and that said Letters Patent is hereby corrected as shown below:

operationalized knowledge to determine a subgoal modification associated with a specific subgoal.

Col. 13, line 56 thru Column 14, line 15, please replace Claim 19, with the following:

19. Software for operationalizing a goal, the software embodied in a computer-readable medium and, when executed on a computer system comprising one or more processing units and one or more memory units, operable to:
receive the goal and a plurality of execution rules associated with the goal, each execution rule corresponding to an execution system for initiating execution of the execution rule;
represent the goal in a representation language comprising a set of operations;
apply an operation of the set of operations to the goal to partition the goal into a plurality of subgoals;
responsive to a determination that a foreign goal exists, introduce the foreign goal as a subgoal, the foreign goal being independent of application of an operation of the set of operations to the goal;
for each subgoal, apply an operation of the set of operations to the subgoal to derive and configure an execution rule associated with the subgoal;
record the goals, the applied operations, the subgoals, and the execution rules as operationalized knowledge to operationalize the goal;
receive a goal modification associated with the goal; and
propagate the goal modification from the goal to the subgoals according to the operationalized knowledge to determine a subgoal modification associated with a specific subgoal.

UNITED STATES PATENT AND TRADEMARK OFFICE
CERTIFICATE OF CORRECTION

PATENT NO.       : 7,383,240 B2
APPLICATION NO.  : 10/308333
DATED            : June 3, 2008
INVENTOR(S)      : Vijay Mital et al.

It is certified that error appears in the above-identified patent and that said Letters Patent is hereby corrected as shown below:

Col. 15 please replace Claim 28, lines 6-32, with the following:

28. A system for generating an optimized supplier allocation plan, comprising:
means for receiving a goal and a plurality of execution rules associated with the goal, each execution rule corresponding to an execution system for initiating execution of the execution rule;
means for representing the goal in a representation language comprising a set of operations;
means for applying an operation of the set of operations to the goal to partition the goal into a plurality of subgoals;
responsive to a determination that a foreign goal exists, means for introducing the foreign goal as a subgoal, the foreign goal being independent of application of an operation of the set of operations to the goal;
for each subgoal, means for applying an operation of the set of operations to the subgoal to derive and configure an execution rule associated with the subgoal;
means for recording the goals, the applied operations, the subgoals, and the execution rules as operationalized knowledge to operationalize the goal;
means for receiving a goal modification associated with the goal; and
means for propagating the goal modification from the goal to the subgoals according to the operationalized knowledge to determine a subgoal modification associated with a specific subgoal.

This certificate supersedes the Certificates of Correction issued August 19, 2008 and September 16, 2008.

Signed and Sealed this

Seventh Day of October, 2008

JON W. DUDAS
*Director of the United States Patent and Trademark Office*